(12) United States Patent
Sotgiu

(10) Patent No.: US 7,768,632 B2
(45) Date of Patent: Aug. 3, 2010

(54) METHOD OF AND APPARATUS FOR DETERMINING GEOMETRICAL DIMENSIONS OF A VEHICLE WHEEL

(75) Inventor: Paolo Sotgiu, Modena (IT)

(73) Assignee: Snap on Equipment SRL a Unico Socio, Corregio (RE) (IT)

( * ) Notice: Subject to any disclaimer, the term of this patent is extended or adjusted under 35 U.S.C. 154(b) by 110 days.

(21) Appl. No.: 12/126,368

(22) Filed: May 23, 2008

(65) Prior Publication Data
US 2008/0297777 A1  Dec. 4, 2008

(30) Foreign Application Priority Data
May 23, 2007  (EP) .................................. 07010263

(51) Int. Cl.
*G01B 11/275* (2006.01)
(52) U.S. Cl. ................................. 356/139.09
(58) Field of Classification Search ............ 356/139.09, 356/155; 301/5.21; 73/460–462
See application file for complete search history.

(56) References Cited

U.S. PATENT DOCUMENTS

| | | | |
|---|---|---|---|
| 3,877,505 A | 4/1975 | Besuden et al. | |
| 5,054,918 A | 10/1991 | Downing et al. | |
| 6,657,711 B1 * | 12/2003 | Kitagawa et al. | ............. 356/155 |
| 7,221,441 B2 * | 5/2007 | Douglas et al. | ........ 356/139.09 |
| 7,230,694 B2 * | 6/2007 | Forster et al. | .......... 356/139.03 |
| 7,466,430 B2 * | 12/2008 | Braghiroli | ................... 356/607 |
| 7,594,437 B2 * | 9/2009 | Matteucci et al. | ............. 73/460 |
| 2004/0165180 A1 | 8/2004 | Voeller et al. | |

FOREIGN PATENT DOCUMENTS

| | | |
|---|---|---|
| DE | 25 29 343 | 1/1977 |
| DE | 25 29 343 C3 | 1/1977 |
| EP | 1 479 538 A2 | 11/2004 |
| EP | 1 584 495 B1 | 10/2005 |

\* cited by examiner

*Primary Examiner*—Isam Alsomiri
(74) *Attorney, Agent, or Firm*—McDermott Will & Emery LLP

(57) ABSTRACT

A method and an apparatus of determining geometrical dimensions of a motor vehicle wheel (rim/tire assembly) 1 by contact-less sensing, wherein the wheel is fixed on wheel receiving means 2 of a tire changer, that at least one light beam 21 is emitted on to the wheel or at least a part of the wheel, wherein the light beam reflected at the impingement area is detected, and wherein the directions of the emitted and reflected light beams are evaluated for determining the shape and/or position of the respective impingement area on the wheel.

26 Claims, 3 Drawing Sheets

METHOD OF AND APPARATUS FOR DETERMINING GEOMETRICAL DIMENSIONS OF A VEHICLE WHEEL

CROSS REFERENCE TO RELATED APPLICATION

This application is based upon and claims the benefit of priority from European Patent Application 07 010 263.7-2425 filed on May 23, 2007, the entire contents of which are incorporated by reference herein.

BACKGROUND OF THE INVENTION (1) Field of the Invention

The invention concerns a method of and apparatus for determining geometrical dimensions of a vehicle wheel, in particular of a wheel rim.

(2) Description of Related Art

An apparatus which is known from U.S. Pat. No. 3,877,505 has a wheel receiving device to which the rim of a motor vehicle wheel can be fixed. The wheel receiving device can be rotated during the fitting or removal operation by means of a rotary drive device, for example an electric motor. The tyre can be fitted to the rim or released from the rim by means of fitting or removal tools. Provided on the removal tool is a sensing device in the form of a projection which senses the radial outside surface (rim bed) of the rim and which comprises a material which does not damage the rim material, for example plastic material. That ensures that the removal tool is kept at a given spacing from the surface of the rim in the removal operation. That prevents the rim surface being damaged by the hard material of the removal tool. In that case however there is the danger that the projection which senses the rim contour and which maintains the spacing wears away due to abrasion or is damaged in some other fashion.

It is also known from DE 25 29 343 B2 for the fitting or removal tool to be moved along a control surface which ensures that the tool is guided on a curved path along the rim contour in the rim bed during the fitting or removal operation. Here too there is the danger that the guidance along the desired curved path is no longer achieved due to abrasion wear at the control surface. The control surface therefore has to be frequently replaced.

U.S. Pat. No. 5,054,918 discloses a structured light scanning system that determines structural features of a vehicle wheel by analysing the reflected light from a stripe where a planar light beam impinges the body of the vehicle wheel.

SUMMARY OF THE INVENTION

The problem of the present invention is to provide a method and an apparatus of the kind set forth in the opening part of this specification, in which the geometrical dimensions of a vehicle wheel at least one part of a vehicle wheel are reliably determined and in particular the fitting or removal of the tyre is performed in such a way as to protect the rim of the vehicle wheel during the fitting or removal operation.

That problem is solved by the features disclosed herein the present specification.

The invention provides that the wheel (rim/tyre assembly) contour, especially the rim contour is sensed in an optical manner. A preferred optical system is based on the principle of triangulation. The sensing signals of the sensing device are converted into electrical sensing signals. A suitable transducer device is preferably integrated into the sensing device. The sensing device can comprise a plurality of sensing devices. Preferably sensing is effected at two sides of the vehicle wheel (rim/tyre assembly) or of the rim well-base bed, wherein sensing is effected from the respective rim bead towards the centre of the rim bed. In that situation the rim contour is determined at least in the regions in which the fitting or removal tool is moved during the fitting or removal operation. In known fashion, particularly in the removal operation, it is possible to use two removal tools which engage the two bead regions of the vehicle tyre. The movement of the respective fitting or removal tool is guided in dependence on the sensing signals in such a way that no contact with the surface in the rim bed and at the rim beads occurs.

The respective fitting or removal tool is therefore always guided at a given safety spacing from the rim surface.

For contact-less sensing, the respective sensing device can be a sheet of light imaging system based on the principle of optical laser triangulation, also designated hereafter as triangulation method. The optical sensing device can have a light source that emits a light beam in a planar light beam shaped in a sheet of light or a planar light beam onto the wheel surface or the rim surface in one or more given directions and intersects the rim surface in a plurality of impingement points along a stripe-shaped impingement area. Further, it is possible to scan the wheel or rim surface by a single light beam which is moved in a planar plane. At each of the impingement points, the light beam is scattered in a plurality of light rays that are reflected. At least a plurality of these reflected light rays will be then concentrated by a lens into a point before being detected by a photosensitive detector. The spacings and thus positions of the individual impingement points sensed at the wheel or the rim can then be determined by the triangulation method in dependence on the directions of the emitted and reflected light beams.

The invention can be used to determine additionally at least one of the following parameters: tire run out, probably in multiple positions; tread wear, probably in multiple positions; tire conicity; tyre defects on the tread and on the side walls; rim defects on the outside and inside, bead seat geometry on the rim.

BRIEF DESCRIPTION OF THE DRAWINGS

The invention will be described in greater detail hereinafter by means of an embodiment by way of example with reference to the Figures in which.

DETAILED DESCRIPTION

The illustrated embodiments include a wheel receiving means 2 to which a rim 3 of a motor vehicle wheel (rim/tyre arrangement) 1 can be fixed. The wheel receiving means can have as illustrated a receiving bar, a wheel plate on which the rim is placed, or clamping arms on which the rim is supported, or another support arrangement. The rim 3 is non-rotatably connected to the wheel receiving means 2 by fixing means, in particular clamping means.

Figure 1:
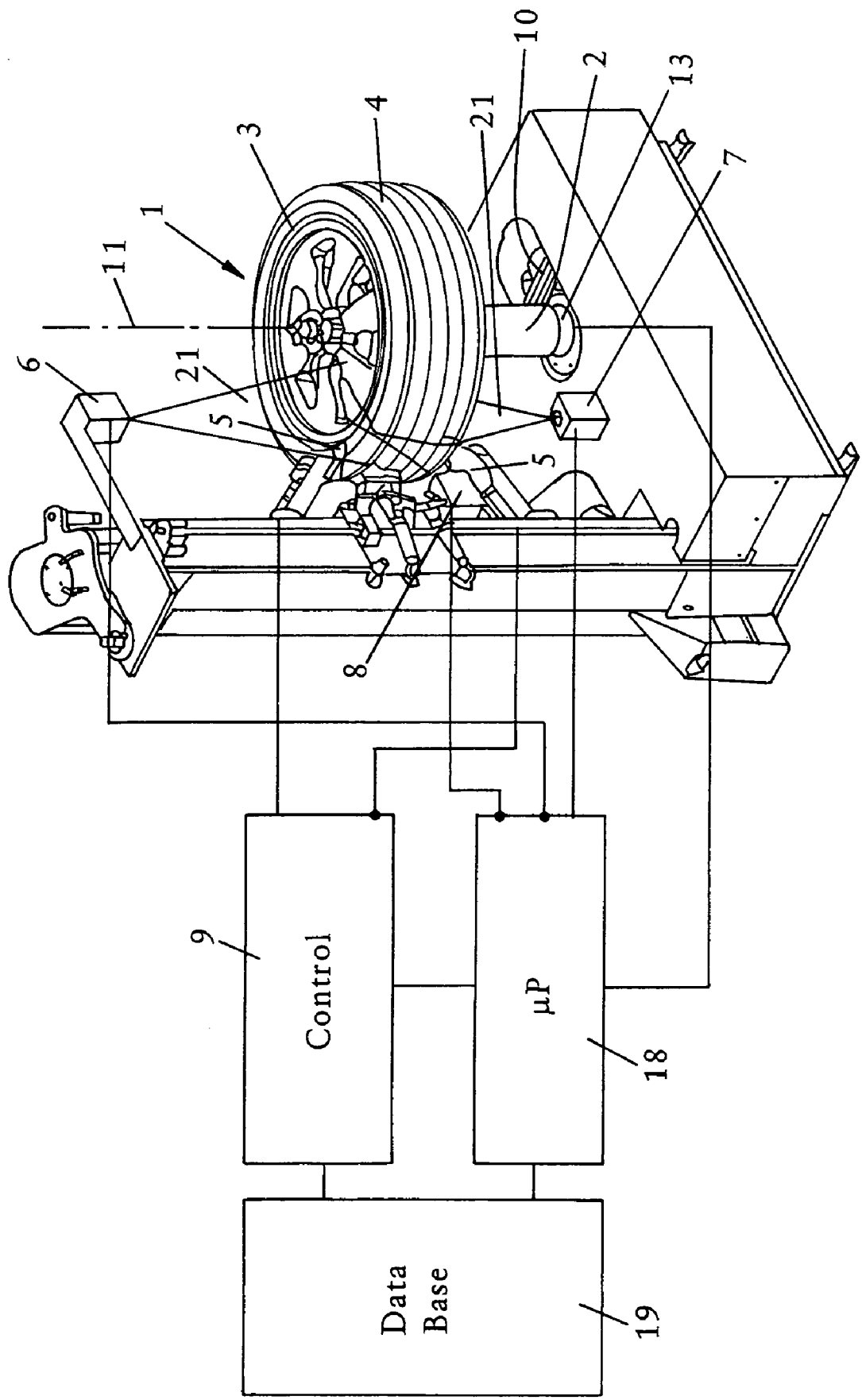
FIG. 1 shows an embodiment of the invention.
Figure 2:
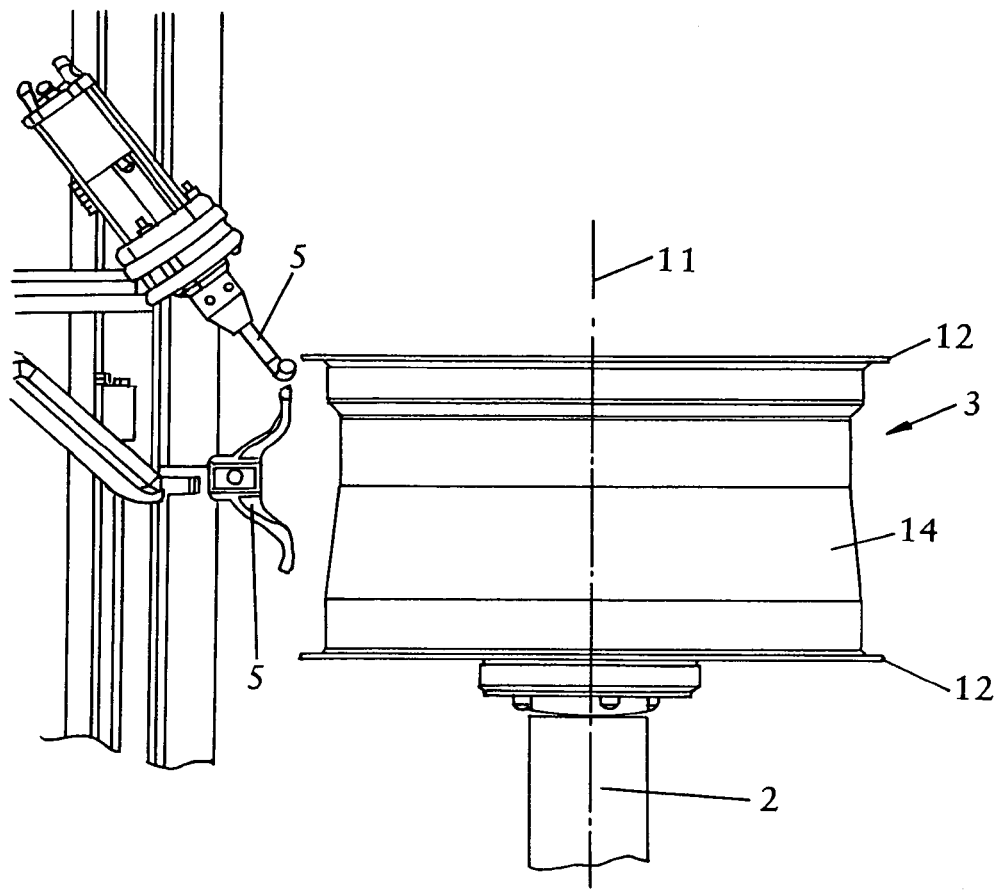
FIG. 2 shows a more detailed view of the fitting or removal tools such as depicted in the embodiment of FIG. 1.
Figure 3:
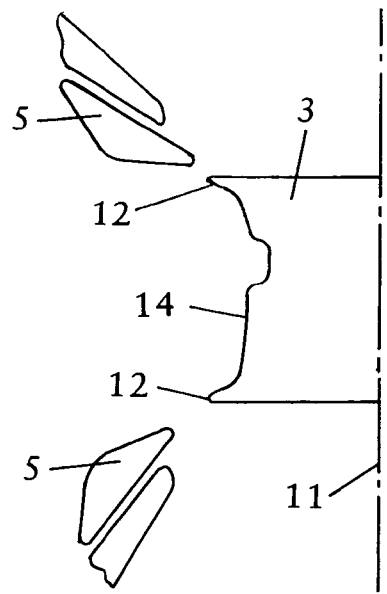
FIG. 3 shows a more detailed view of the bead breaking tools as depicted in the embodiment of FIG. 1.

The illustrated embodiment also includes fitting or removal tools 5 which are diagrammatically illustrated in FIG. 2, bead breaking tools which are diagrammatically illustrated in FIG. 3 and which, when the motor vehicle wheel 1 is arranged horizontally, are caused to come into contact with side walls of the tyre 4 from below and from above in the proximity of tyre beads 12 which, when the motor vehicle tyre 1 is in the fitted condition, lie behind the two lateral rim beads 12 of the rim 3.

The wheel receiving means 2 is caused to rotate by means of a rotary drive device 10 which can be in the form of an electric motor. The rotary drive takes place about a wheel axis 11.

Provided at both sides of the rim 3 or in the illustrated embodiment at the top side of the rim or of the wheel 1 and at the underside of the rim or of the wheel 1 are sensing devices 6 and 7 with which it is possible to implement contact-less and in particular optical sensing of the rim beads 12 at the radial outer surface (rim bed 14) of the rim 3. The contour of the rim bed 14 is shown in FIGS. 2 and 3.

Contact-less and in particular optical sensing with the sensing devices 6 and 7 which are arranged laterally of the rim 3 is effected essentially for sensing the rim contour in the region of the rim beads 12. Additionally, it is possible to sense geometrical dimensions of the wheel 1 and of wheel parts, especially of the tyre 4.

The principle of such contact-less sensing rests on a triangulation method such as described hereafter. The sensing device 6, 7 has a light source 15, e.g. a laser source, comprising a pattern generator, e.g. an optical line generator made with a cylindrical lens, which emits a planar light beam shaped in a sheet of light by the pattern generator onto the rim surface in one or more given directions and intersects the rim surface in a plurality of impingement points which forms a stripe-shaped impingement area on the wheel surface or the rim surface. The impingement points belong to both the impinged surface and the sheet of light. At each of these impingement points, the light beam is scattered in a plurality of light rays or beams that are reflected. At least a plurality of reflected light beams will be then detected by a photosensitive detector 16, e.g. an area image sensor that may be either a CCD device or preferably a CMOS device. Before being detected, each of these at least a plurality of reflected light beams is concentrated by a lens 17, e.g. a single, glass, plan-convex lens that may be associated with an optical band-pass filter, into a point projected onto the focal plane of the photosensitive detector 16. In order to improve measurement accuracy, each projected point has a position determined preferably with a sub-pixel resolution rather than the physical pixel one. That determination can be achieved by several well-known detection techniques, such as the Gaussian approximation, centroid or centre of mass algorithms, or parabolic estimator. Relationship between the position in a three dimensional coordinate system of an impingement point, expressed in unit of length of the systemè international (SI) base unit, and the position in a two dimensional coordinate system of the corresponding projected point, expressed preferably in sub-pixel, is defined by calibration using a reverse transform. Calibration can be carried out either by using the so-called model-based calibration based on the geometric camera model approach or by using the direct or black-box calibration based on a polynomial interpolation such as the cubic spline interpolation. The spacings and thus positions of the individual impingement points sensed at the wheel (rim/tyre assembly) or the rim can then be determined in dependence on the directions of the emitted and reflected light beams. It should be noted that the geometric optical setup of the optical sensing device 6 to 8 can be designed in a way that the Scheimpflug principle is respected in order to avoid excessive defocusing at different distances, and that the background subtraction can be implemented in order to reduce the system sensitivity to ambient light. Moreover, both the light power and the exposure time of the photosensitive detector 16 can be controlled by the system in order to achieve accurate measurements in all the environmental conditions, such as sunlight, artificial light, shiny chromed surfaces, black dusty surfaces.

In the tyre removal operation, when the motor vehicle wheel is rotated about the wheel axis 11 through at least 360°, the shapes and the spatial positionings of the rim beads 12 with respect to a reference which is fixed in relation to the machine, for example with respect to the axis of rotation about which the wheel receiving means 2 is rotated and which coincides with the wheel axis 11, are determined in a horizontal plane. In addition the outside diameters of the two rim beads 12, in particular the position of the outer peripheries of the two rim beads 12 with respect to the reference which is fixed in relation to the machine, can be determined. It is also possible in that case to determine rotary angle-related height-wise and lateral run-out of the rim beads 12. A rotary angle sender 13 can be provided at the drive device 10 or at the wheel receiving means 2, for ascertaining the respective rotary angles. The corresponding rotary angle signals are sent to an evaluation arrangement 18 to which the electrical sensing signals from the sensing devices 6 and 7 are also sent. The sensing directions of the sensing devices 6 and 7 may be approximately parallel to the rotation axis 11 of the wheel 1. That evaluation arrangement 18 evaluates the sensing signals and the rotary angle signals with computer aid and, as already explained, ascertains the spatial positioning preferably of the outer peripheries and possibly also the shapes of the rim beads 12 with respect to the reference which is fixed in relation to the machine, in particular the axis of rotation of the wheel receiving means 2, which is coincident with the wheel axis 11. In addition referencing is effected with respect to at least one horizontal plane that is fixed in relation to the machine, so that the spatial position of the rim beads 12 with respect to the machine frame and thus with respect to the fitting or removal tools 5 which are guided on the machine frame is determined.

At the beginning of the removal operation the tyre beads are released from the rim beads 12 and pushed into the interior of the rim bed. In order to ensure that the bead breaking tools and the removal tools 5 engage the tyre in the hard region of the tyre beads, control of the movements of the removal tools 5 is effected in dependence on the position of the rim bead peripheries and the respective rim bed profile. For that purpose, a control device 9 is connected to the evaluation arrangement 18 and to a store 19, for example in the form of a database, in which, for various types of wheels, the contours of the rim beds 14, that is to say the contours between the respective rim beads 12, are stored. As the spatial positioning of the two rim beads 12 or at least one of the two rim beads 12 with respect to the machine frame is already determined by virtue of optical sensing and evaluation of the sensing signals, the spatial position of the rim bed 14 which is between the two rim beads 12 and thus the position of the rim bed contour between the two rim beads 12 is also known. Accordingly, further positioning of the removal tools 5 is effected along given curved paths at a spacing from the surface of the rim bed 14. The control device 9 includes driver stages which are suitably designed for that purpose, for the movements of the fitting and removal tools. A respective control of the tools 5 can be performed also during the fitting of the tyre 4 on the rim 3.

Advantageously, the sensing devices 6 and 7 are disposed in front of the fitting or removal tools 5, in a direction parallel to the wheel axis 11. It is then not necessary firstly to effect sensing at the rim 3 over the entire periphery of the wheel (360°), but the controlled movement of the fitting or removal tools 5 can be effected immediately after sensing of the respective rim regions when those sensed rim regions come into the region for access of the fitting or removal tools 5 in the rotary movement of the wheel.

A third sensing device 8 can be provided for sensing the wheel rim 3, in particular for sensing the rim bed 14, and may be disposed on a support movable in a vertical direction. The sensing direction of that sensing device 8 is oriented substantially in a horizontal direction, wherein the overall width of the rim bed 14 between the two rim beads 12 and the outer peripheral edges of the rim beads 12 is determined so that the contour of the rim bed 14 is ascertained. That contour can also be detected in rotary angle-related relationship as at the same time the respective rotary angles are detected by means of the rotary angle sender 13 and corresponding electrical rotary angle signals are fed to the control device 9. The sensing device 8, which is preferably an optically sensing device, sends electrical sensing signals to the control device 9. The contour of the rim bed can be detected in rotary angle-related relationship in that way prior to the tyre fitting operation. In addition, the outer peripheral edges of the rim beads 12 and the regions, which are adjacent to the rim bed, of the rim beads 12 can also be sensed. As the position of the sensing device 8 is established in the same manner as the positions of the sensing devices 6 and 7 on the machine frame and are thus known, the spatial positioning of the rim bed and the rim beads 12 can be determined in particular by the optical measurement of the spacing involved, for example using the previously described triangulation method. When fitting the motor vehicle tyre 4 to the rim 3, the fitting tools 5 can then be controlled in their movement in such a way that no contact occurs with the rim surface, in particular in the region of the rim beads 12 and in the region of the rim bed.

The tyre profile can also be optically sensed with the sensing device 8 when the tyre 4 is mounted on the rim 3. The side walls of the tyre 4 can be sensed by the sensing devices 6 and 7.

Figure 4:
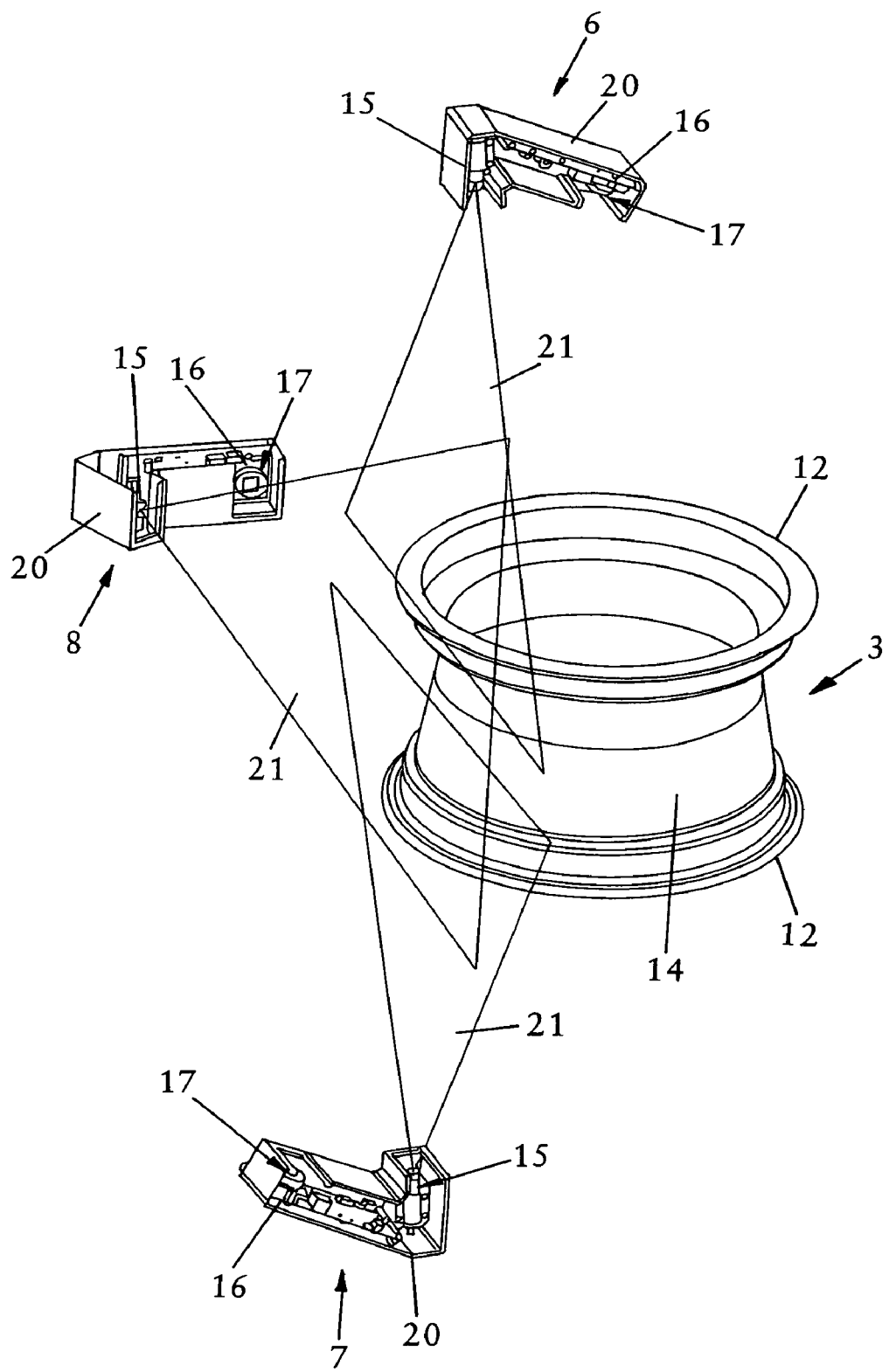
FIG. 4 shows an embodiment for an arrangement of optical sensing devices.

The spatial positions of the respective sensed points can be ascertained by spacing measurement, in particular using the previously described triangulation method. With the device shown in FIG. 4, it is possible for the dimensions of the rim 3 or of the tyre 4 to be determined also in regard to heightwise and lateral run-out. As shown in the Figures, each sensing device 6, 7 and 8 can have the light source 15, in particular a laser beam source shaped in a sheet 21 of light or planar light beam by a pattern generator, e.g. an optical line generator made with a cylindrical lens, which are mounted with a photosensitive sensor 16, such as a CMOS sensor or CCD sensor, on a common carrier 20. Further, the light source 15 can be configured to emit a single linear light beam which is swivelled about a not shown axis to be moved within a planar plane corresponding to the planar plane or light sheet 21. The not shown axes are arranged fixedly with respect to the machine and can form the machine-related position references for the points which are sensed on the rim 3. The planar light beams emitted by the respective light sources intersect the surface of the rim 3 in a plurality of impingement points and are reflected at each of that plurality of impingement points. At least a plurality of these reflected light beams is concentrated by a lens 17, e.g. a single, glass, plano-convex lens that may be associated with an optical band-pass filter, into a point that is projected and passed onto the sensor 16 by way of an optical receiver system. The projected point at the sensor 16 is proportional to the directions of the light beam which is emitted by the light source 15 and the reflected light beam and thus to the spacing of the corresponding impingement point at which the sensing light beam impinges on the rim surface. The spacings of the impingement points and its spatial positions with respect to the machine frame can be determined by means of the previously described triangulation method. The respective sensing signals of the sensors 16 are passed to the evaluation arrangement, as already described hereinbefore. Evaluation of the signals in the evaluation arrangement 18 is effected by means of an electronic computer. The respective rotary angle position of the rim 3 is determined by the rotary angle sender 13 which is connected to the evaluation arrangement 18.

LIST OF REFERENCES 1 motor vehicle wheel
2 wheel receiving device
3 rim
4 motor vehicle tyre
5 fitting or removal tools
6 sensing device
7 sensing device
8 sensing device
9 control device
10 rotary drive device
11 wheel axle
12 rim beads
13 rotary angle sender
14 rim bed
15 light source (laser beam source)
16 detector
17 pivot axis
18 evaluation arrangement
19 store (database)
20 carrier
21 light-sheet (planar light beam)

The invention claimed is:

1. A method of fitting or removing a motor vehicle tire comprising the steps of:
   fixing a rim of a motor vehicle wheel rim/tire assembly on wheel receiving means of a tire changer, the wheel having two rim beads;
   determining geometrical dimensions of the wheel by contactless sensing, wherein at least one planar light beam is emitted onto at least one rim bead of the wheel, the at least one light beam reflected at a stripe-shaped impingement area on the wheel is detected, and directions of the emitted and reflected light beams are evaluated for determining the shape and/or position of said impingement area on the wheel,
   guiding the movement of a fitting or removal tool in dependence of the determined geometrical dimensions of the at least one rim bead, and
   at least one planar light beam is emitted from a stationary position, wherein a rim contour along which the fitting or removal tool is guided during the fitting or removal operation is determined from the stripe-shaped impingement area, and the movement of the fitting or removal tool is guided in dependence on the determined contour without contact with a rim surface.

2. The method according to claim 1,
   Wherein the at least one light beam is directed onto the wheel or onto the rim which is rotated about a stationary axis.

3. The method according to claim 1,
   wherein an outer peripheral surface of the rim is sensed with the planar light beam.

4. The method according to claim 1,
wherein spacings of the rim beads which are sensed by the planar light beam relative to a stationary reference are ascertained.

5. The method according to claim 4,
wherein the ascertaining of the spacings is effected in accordance with a triangulation method.

6. The method according to claim 1,
wherein respective emitted and reflected light beams associated with a plurality of impingement points of the stripe-shaped impingement area are detected and the positions of the respective impingement points are determined.

7. The method according to claim 1,
wherein the movement of the at least one fitting or removal tool is controlled in dependence on a sensed position of the at least one rim bead and in dependence on the stored or sensed contour of a rim bed.

8. The method according to claim 1,
wherein the movement on the at least one fitting or removal tool is controlled in dependence on the detected position of an outer peripheral edge of the at least one rim bead.

9. The method according to claim 1,
wherein the emitted light beam is a single linear beam which is swiveled in a plane.

10. Use of a method according to one of claims 1 to 9 for determining at least one of the parameters: tire runout, tread wear of the tire, tire conicity, tire defects on the tread and/or on the side walls, rim defects on the outside and/or on the inside of the rim and bead seat geometry on the rim.

11. An apparatus for fitting or removing a motor vehicle tire comprising a rotatably supported wheel receiving device to which a wheel having two rim beads or a rim is to be fixed;
at least one fitting or removal tool;
a rotary drive device for the wheel receiving device;
a sensing device for sensing a radially outer contour,
wherein the sensing device has at least one light source which emits a planar light beam from at least one given position onto at least one rim bead, and a detector which detects the direction of the light beam reflected from a stripe-shaped impingement area on the wheel surface;
a computer-aided evaluation arrangement for evaluation of electrical sensing signals supplied by the sensing device being suitable for determining a shape and/or position of the sensed wheel surface; and
a control device which is connected to the evaluation arrangement to control the movement of the at least one fitting or removal tool in the fitting or removal operation in dependence of the sensing signals,
wherein the at least one light source and the detector are positioned stationary,
wherein the evaluation arrangement is suitable for determining from the stripe-shaped impingement area a rim contour along which the at least one fitting or removal tool is to be guided during the fitting or removal operation, and
wherein the control device is configured to control the at least one fitting or removal tool in the fitting or removal operation in dependence on the determined rim contour without contact with the rim surface.

12. The apparatus according to claim 11,
wherein at least one light source and an associated detector are provided as the sensing device for sensing an outside surface of the rim or of the wheel.

13. The apparatus according to claim 11,
wherein the light source and the detector are pivotable synchronously about a common axis for emitting a single light beam in a planar plane and an electrical signal proportional to the respective pivot angle is fed to the evaluation arrangement.

14. The apparatus according to claim 11,
wherein the evaluation arrangement is suitable for determining positions of respective locations which are sensed on the wheel surface or on the rim surface from the directions of the light beam emitted by the light source and the light beam reflected at the wheel surface or the rim surface by means of triangulation.

15. The apparatus according to claim 11,
wherein the wheel or the rim is mounted on a wheel receiving device rotatably about an axis of the wheel.

16. The apparatus according to claim 11,
wherein a rotary angle sensor detects a respective rotary angle position of the wheel or the rim and supplies a corresponding electrical signal to the evaluation arrangement.

17. The apparatus according to claim 11,
wherein the sensing device is arranged in front of the at least one fitting or removal tool in a direction of rotation of the wheel receiving device.

18. The apparatus according to claim 11,
wherein the sensing direction of the sensing device is approximately parallel to a rotation axis of the wheel or the rim.

19. The apparatus according to claim 11,
wherein spatial positions of the respectively sensed points on the wheel or the rim are determined with respect to the fitting or removal tool.

20. The apparatus according to claim 11,
wherein the evaluation arrangement is designed to determine a respective spatial position of outer peripheral edges of the rim beads.

21. The apparatus according to claim 11,
wherein the evaluation arrangement is suitable for determining the spatial position of a rim bed which is between the rim beads.

22. The apparatus according to claim 11,
wherein for different wheel types, contours of the rim beads are stored in a database of the control device or in a database connected to the control device.

23. The apparatus according to claim 11,
wherein contours of the rim beads are stored in a database.

24. The apparatus according to claim 11,
wherein for different wheel types features of the wheels are stored in a database of the control device.

25. The apparatus according to claim 11,
wherein the light source is a laser.

26. The apparatus according to claim 11,
wherein the detector comprises a complementary metal oxide semiconductor (CMOS) device or a charge coupled device (CCD).

* * * * *